United States Patent
Romeo

[15] 3,669,309
[45] June 13, 1972

[54] MACHINES FOR SEQUENCING ELECTRONIC COMPONENTS

[72] Inventor: Vincent P. Romeo, Danvers, Mass.
[73] Assignee: USM Corporation, Flemington, N.J.
[22] Filed: June 2, 1970
[21] Appl. No.: 42,830

[52] U.S. Cl...........................221/225, 53/59, 53/200, 156/552, 198/103, 221/237, 221/253
[51] Int. Cl.............................................B65h 5/26
[58] Field of Search...............221/9, 218, 219, 225, 237, 221/253, 266; 198/75, 103, 179; 53/59, 200; 156/552

[56] References Cited

UNITED STATES PATENTS

| | | | |
|---|---|---|---|
| 2,298,955 | 10/1942 | Mason et al.......................198/179 X |
| 3,421,284 | 1/1969 | Zemek................................221/9 X |
| 1,854,943 | 4/1932 | Kunath..............................221/219 |
| 2,868,413 | 1/1959 | Vossen...............................221/9 |
| 3,537,580 | 11/1970 | Beroset............................221/266 X |
| 2,854,054 | 9/1958 | Gross................................221/225 X |

Primary Examiner—Robert B. Reeves
Assistant Examiner—David A. Scherbel
Attorney—Richard A. Wise, Richard B. Megley and Carl E. Johnson

[57] ABSTRACT

For providing a continuous feed strip of programmed electronic components, a plurality of components, releasable in selected predetermined order from their respectively unique sources, is fed to a conveyor carrying them seriatim to a taping station. The conveyor includes a series of articulated carriers movable relative to the delivery zones of dispensers and adapted, respectively, to exercise full and continuous control of each component until released therefrom to be taped. Production is thereby insured, even at a high rate of operation, of a programmed component supply tape, its components uniformly and closely spaced as desired and none missing or damaged.

5 Claims, 13 Drawing Figures

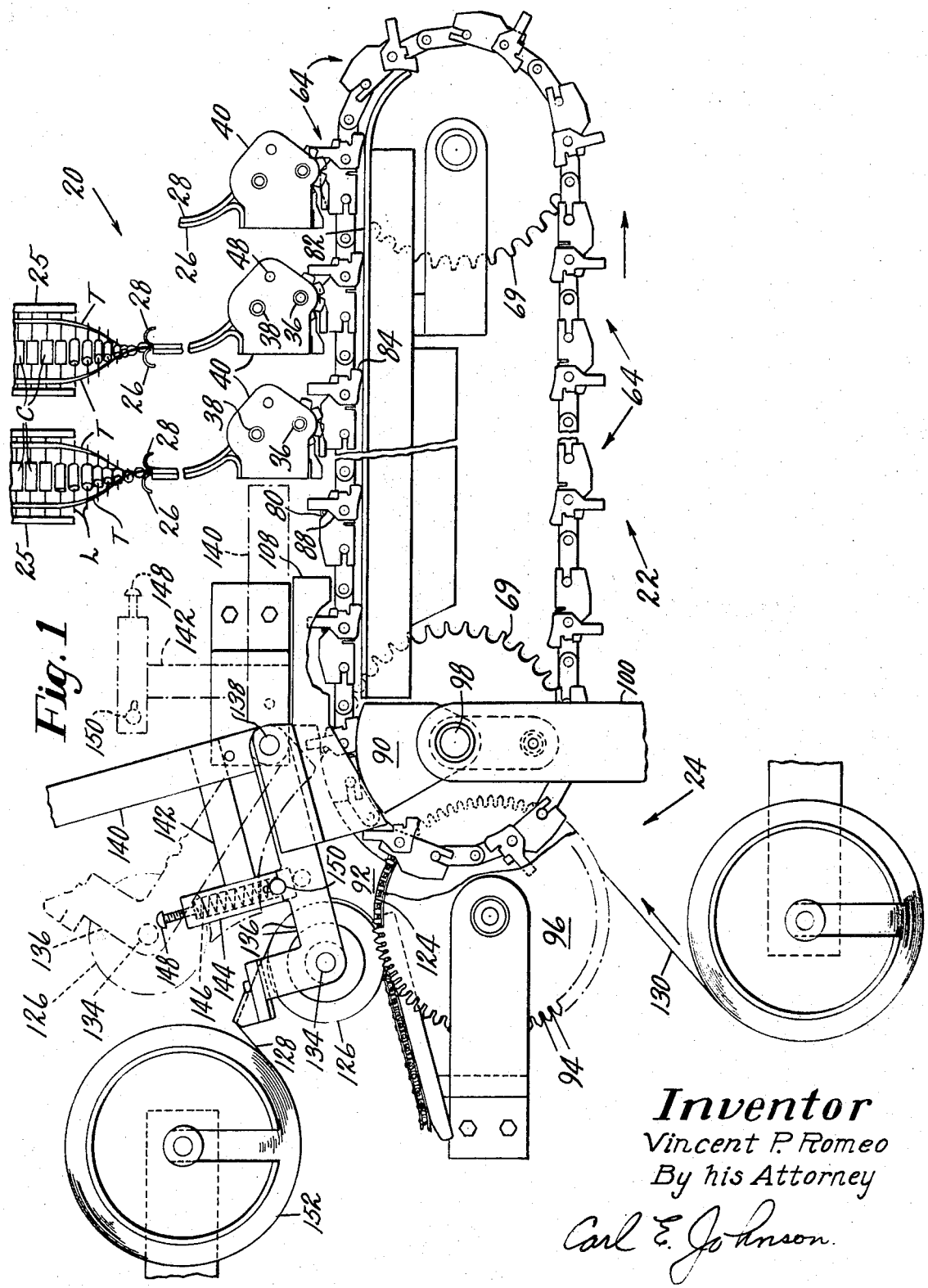

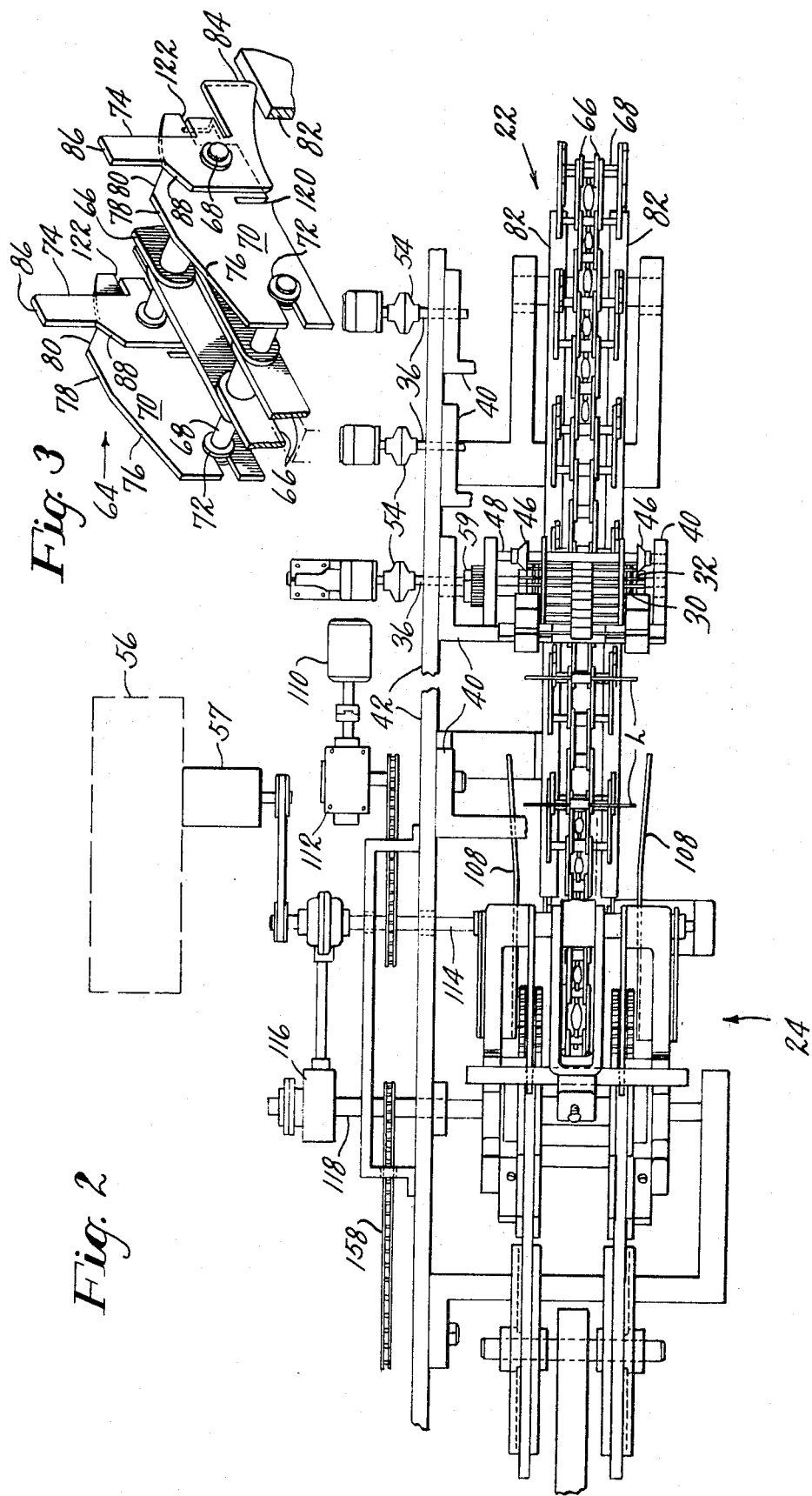

MACHINES FOR SEQUENCING ELECTRONIC COMPONENTS

CROSS-REFERENCE TO RELATED APPLICATION

An application Ser. No. 799,463 dated Feb. 14, 1969, now U.S. Pat. No. 3,591,040 and filed in the name of Arthur Lambert, discloses a mechanism for sequentially supplying components from a plurality of sources to an inserting machine.

BACKGROUND OF THE INVENTION

In U.S. Pat. No. 2,771,206 there is disclosed a machine of a type which has been commonly employed to straighten leads and to link or tape the coaxial leads of components side by side in a row. That is to say, for example, a component supplier customarily provides reels of taped components all of one electrical classification, such as ½-watt resistors or all capacitors of a given size and rating, which are stored in their respective reels. An assembler of circuit boards then has a choice, largely dependent on the complexity and size of a particular production run, whether to insert components from the different reels or to use such reels in a programed manner to presequence the different components from the several reels onto a new reel of taped components in accordance with sequential requirements of a particular circuit.

An alternative procedure, as disclosed in U.S. Pat. No. 3,001,198, is to provide a plurality of feed hoppers each supplying components of identical type, and then releasing the selected components therefrom for delivery to an insertion point.

Since the variety of components is often large, sometimes necessitating a number of component supply reels as many as 20 or more, for instance, to meet the needs of a particular sequence for a circuit assembly, a correspondingly large number of different delivery points must be linearly arranged along a conveyor which is to carry the programed components for taping. There is little or no problem in automatically effecting release of the selected components in desired order from their respective sources of supply, in accordance with the dictates of a program determined for example by computer and controlled as by punched cards or tape or the like, but there is considerable need for means for insuring that the conveyor mechanism receiving and transporting the components in programed sequence will positively, even at high speed, prevent misplacement or non-delivery (unless intentional) of each component in its proper, closely spaced, parallel aligned relation at the taping zone.

Because the leads of a component are light, metallic and tend to rebound upon deposit, restraint must be imposed on them that will not bend them nor interfere with their mobility but will insure their exactly controlled positioning at all times. Provision merely of an aligned row of parallel lead-receiving slots in a conveyor is not satisfactory for providing reliably programmed component supply tapes, the possibility for error being too large and permitting ultimate assembly of a defective circuit. The localities along a conveyor path of a component sequencing machine which are most apt to give rise to inaccurate or faulty control of the leads are at the delivery points of the component dispensers and at the actual taping zone. Free fall of a component from its dispenser to the conveyor, for instance, allows inexact positioning prior to taping, and an impositive or inertial type of drive for a taping wheel permits an uncertain relation to the speed of the conveyor that cannot yield uniformly precisional taping of the components.

SUMMARY OF THE INVENTION

In view of the foregoing it is an object of this invention to provide an improved machine for reliably taping sequenced components in uniform manner as determined by a program.

Another object of this invention is to provide, in a machine having a plurality of component dispensers, a taping station, and a conveyor for transmitting preselected components from the dispensers to the taping station, a means for driving the station in positively timed relation to the conveyor, and a novel means associated with the conveyor and adapted to cooperate with both the dispensers and the station for insuring that the individual components always remain under positive positioning control to become taped.

To these ends, and in accordance with a feature of the invention, an endless chain type of conveyor is fitted with uniformly spaced, articulate carriers for successively picking off components from the selected dispensers, one portion of each carrier being pivotally related to another portion thereof fully to define the path of travel of the transported component.

Another feature of the invention resides in the provision of component dispensers and a taping station arranged at one end of the path of travel of the aforementioned articulated component carriers past the dispensers, cam means mounted for positively controlling confinement and release of the successive components relative to their respective carriers, and a component taping sprocket disposed at the taping station and driven positively in time relation to the carriers to receive and remove each component on release therefrom.

BRIEF DESCRIPTION OF THE DRAWINGS

The foregoing and other features of the invention will now be more particularly described in connection with an illustrative embodiment and with reference to the accompanying drawings thereof, in which:

FIG. 1 is a view in side elevation, with portions broken away, of a machine for taping electronic components in selected, predetermined order, an endless conveyor being arranged to deliver components from component dispensers to a taping station;

FIG. 2 is a plan view of the machine shown in FIG. 1;

FIG. 3 is an enlarged perspective view of an articulated component carrier which is one of a series associated with the conveyor shown in FIGS. 1 and 2;

DESCRIPTION OF THE PREFERRED EMBODIMENTS

Figure 4:
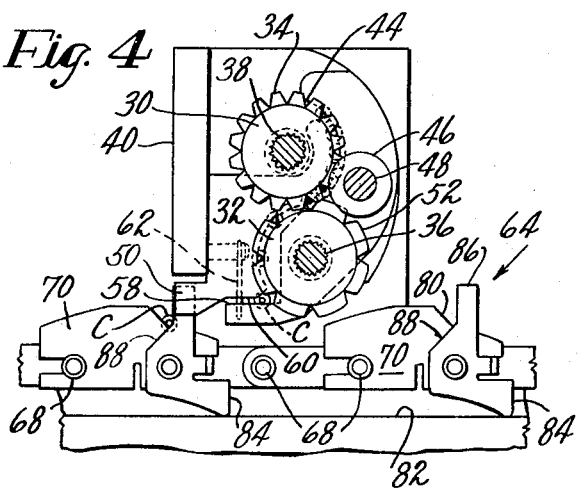
FIGS. 4, 5, and 6 are sequential step views of the component carriers moving to pick off a component from a dispenser lead cutting and releasing zone.

Referring to FIGS. 1 and 2 the illustrative machine comprises a series of dispensers generally designated 20 arranged in uniform spacing in a row parallel to and above the upper reach of a horizontally disposed endless chain type conveyor generally designated 22, and a lead-taping station generally designated 24 disposed at the left-hand end of the conveyor 22. It will be understood that each dispensing means 20 provides its own supply of identical electronic components C which are electrically and mechanically unique to that particular dispensing means, and their coaxial leads L, L will customarily have been taped to retain them in an easily feedable, side-by-side formation. It will be understood that for providing the different components in succession there may be spaced reels, magazines, or other dispensing means not fully shown which, in number, may be 20 or more depending on the number of different components to be inserted in a circuit and therefore desirable to have interconnected by tape or the like in the present machine in a programed manner prior to their circuit board insertion.

Figure 5:
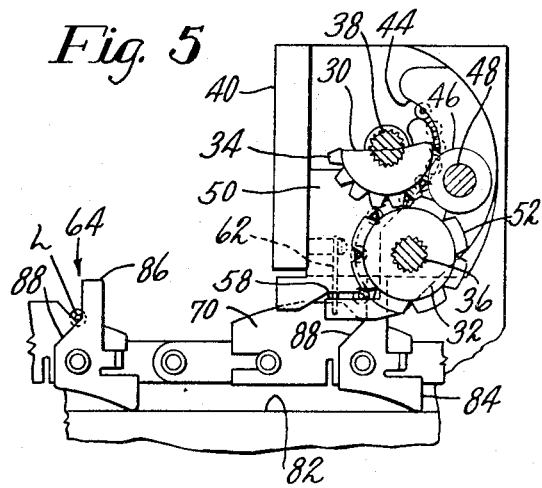
Figure 6:
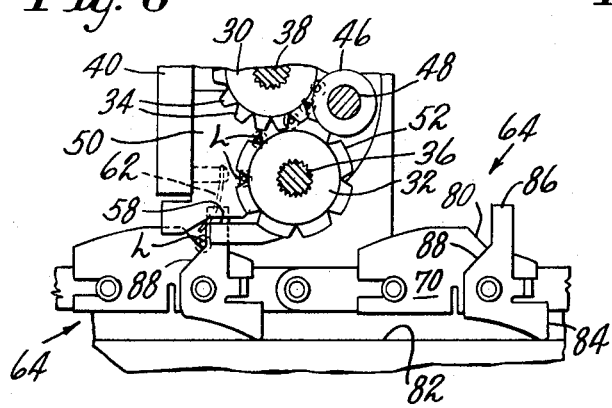
Figure 7:
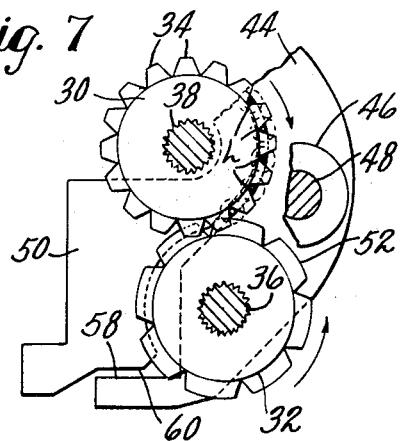
FIGS. 7, 8, and 9 are enlarged sequential views of the component feeding and releasing mechanism associated with each dispenser.
Figure 8:
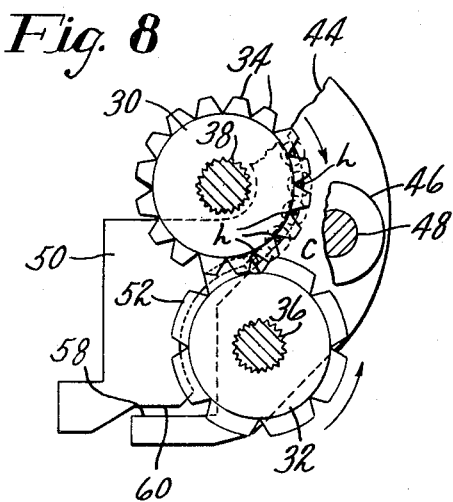
Figure 9:
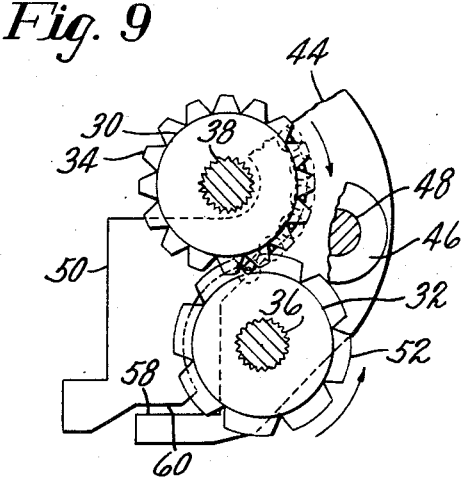

As shown in FIG. 1 each dispenser includes beneath its reel 25 or the like a pair of guideways 26, 28 for conducting the taped components singly in side-by-side relation to two pairs of cooperating, synchronized feed wheels 30, 32 (FIGS. 2 and 4–9 inclusive). The upper wheels 30, 30 are formed with sprocket teeth 34 circumferentially spaced to uniformly index successive pairs of the coaxial leads L of the components C, an interconnecting gear drive (not shown) from a rotary shaft 36 carrying the lower wheels 32, 32 being coupled to a shaft 38 on which the upper wheels 30 are secured. The shafts 36, 38 are journaled in U-shaped castings 40 secured to a conveyor frame 42. The arrangement is such that coaxial leads L are respectively trapped as they descend between the adjacent teeth 34 and adjacent arcuate spaced guideways 44 (FIGS. 4–9) secured to the castings 40. This enables a pair of spaced parallel disk knives 46, 46 (FIG. 2) rotatable on a shaft 48 journaled in the casting to sever successive pairs of leads to the desired length and eliminates the parallel strips of tape T (FIG. 1) which bound identical components C to one another up to this point. As shown in FIGS. 4–9 the releasing wheels 32, 32 are cooperative with spaced parallel guideways 50 secured to the casting 40 and formed with teeth 52 half as many in number as the teeth 34 and therefore driven at twice the speed of the wheels 30. While the knives 46 may be driven, they are herein shown as being rotatable merely by the tractive descent of the leads to be cut. Accordingly when the old tapes T and lead ends are cut away, the new lead ends remain captured between the wheels 30 and the guideways 44 until the leads are transferred into the aligned, respective V-notches of the wheels 32, being then retained by the arcuate guideway 50. In order to advance a selected one of the several different types of components C for release from the proper pairs of wheels 32, 32 their shaft 36 is rotated counter-clockwise, as seen in FIGS. 7–9, an increment of 45° by means of a rotary solenoid 54 (FIG. 2) connected thereto. Each solenoid 54 receives its appropriately timed energization for this purpose from a programmed computer indicated generally at 56 (FIG. 2) with its program tape housing 57. As shown in FIGS. 4–6, coaxial leads L of each component C remain constantly under positional control upon release as will next be described. Preferably a device 59 (FIG. 2) mounted on each shaft 36 prevents its rotary overtravel.

Lower ends of the guideways 44, 44 are formed as a horizontal shelf 58 for supporting the leads L of a component released from the indexed wheels 32, parallel lower portions 60, 60 of the guideways 50 cooperating with the shelves 58 and defining exit passages which restrain the component for movement parallel to the conveyor path and closely adjacent thereto. For insuring that each component does not get misaligned or prematurely escape its exit passage, an elastomeric flexible strip 62 (FIGS. 4–6) secured at its upper end to the casting 40 depends beneath the shelf level and in the path of the component body thereby restraining it until the conveyor picks it off by means next to be described.

For enabling the conveyor 22 to travel at good speeds continuously and yet reliably deliver components in correct programed order to the taping station 24, articulated carriers generally designated 64 (FIGS. 1, 3, 10, and 13) are coupled in uniformly spaced formation. For this purpose the conveyor includes an endless chain of links 66, interconnecting pivot pin 68, and spaced sprockets 69, 69 carried by the frame 42 and meshing with the pins 66. As shown in FIG. 3, each carrier 64 includes a pair of leading side plates 70 retained on the outer ends of adjacent pairs of pins 68, respectively, by means of snap rings 72, and a pair of trailing pick-off plates 74 respectively mounted on the trailing pin 68 of each pair. To allow for the spacing of adjacent dispensers 20, as herein shown, each third pin 68 is not required for carrier mounting.

The side plates 70 respectively have advanced inclined edges 76, upper horizontal edges 78 extending just beneath the level of the shelves 58 when traversing the dispensers 20, and trailing inclined edges 80. The pivotal relation of the pick-off plates 74 to the side plates 70 is controlled by cam means which, in the region of the dispensers, constitutes a horizontal pair of cam tracks 82, 82, (FIG. 2) secured to the conveyor frame 42, a tail 84 of each plate 74 riding on one of the tracks 82. When the pick-off plates 74 are thus positioned, their projecting ends 86 are vertical and disposed to engage and advance opposed leads L of the released component C resting and restrained on the shelves 58 as shown in FIG. 5. FIG. 6 shows inclined leading edges 88 of plates 74 forming a pair of aligned V-notches (one only shown) with the edges 80 for receiving and positioning the opposed leads of a released component C. FIG. 4 illustrates a left-hand component C released earlier from one of the dispensers and being transferred in its V-notches 88, 80.

While successive carriers 64 may pick off identical components C from the same dispenser 20, it is usual that the programed release will command the successive carriers to pick off their respective components from different dispensers 20 as required. Also, when desired the programing means will enable one or more carriers 64 to move in translation past all of the dispensers without being loaded thereby providing a gap in the spacing of the components when retaped as will be explained.

Figure 10:
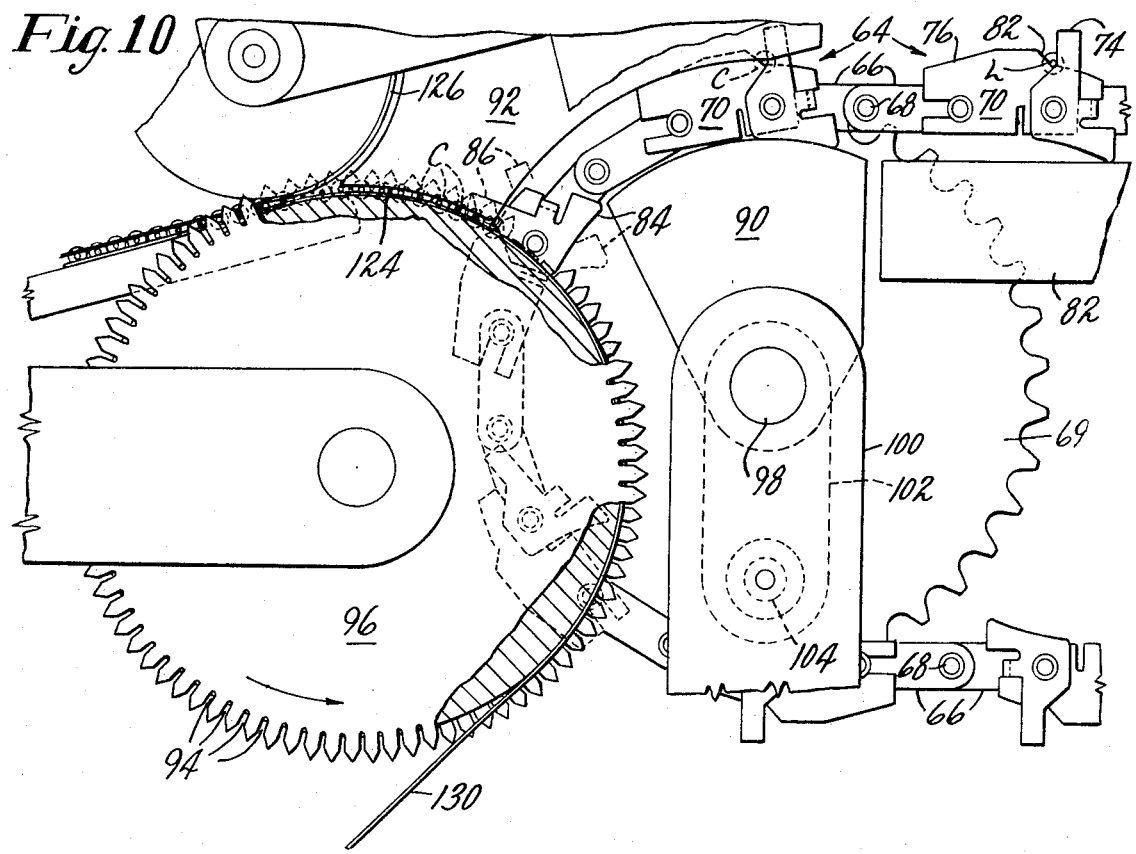
FIG. 10 is a view in enlarged side elevation of the taping station shown in FIG. 1 as it is about to receive a component from a carrier.

On approaching the taping station 24 an arcuate portion of the tail 84 of each carrier plate 74 is engaged and positionally controlled by a parallel pair of arcuate cam plates 90, 90 (FIGS. 1, 10, 11, and 13) in order to restrain the successive components C under an arcuate guideway plate 92 disposed for conducting their leads L into peripheral tooth spaces 94 of aligned taping wheels 96, 96 (FIGS. 10–13). The plate 92 is secured on the machine frame. The cams 90 are mounted on coaxial stub shafts 98 journaled in up-turned ends, respectively, of a U-shaped bracket 100 affixed to the machine frame. As indicated in FIG. 10 a depending portion 102 of each of the cams 90 threadedly receives a binder screw 104 for adjustably engaging the bracket 100 and thus determining the point of the release of the pick-off plates 74 from the cams 90. To ensure that the components C are uniformly spaced laterally prior to being taped, a pair of guides 108, 108 (FIGS. 2, 13) has corresponding ends secured on opposite sides of the conveyor path as later described, free ends of the guides being convergent with the desired path of the leads and disposed to centralize them if need be in their V-notches 80–88.

Figure 11:
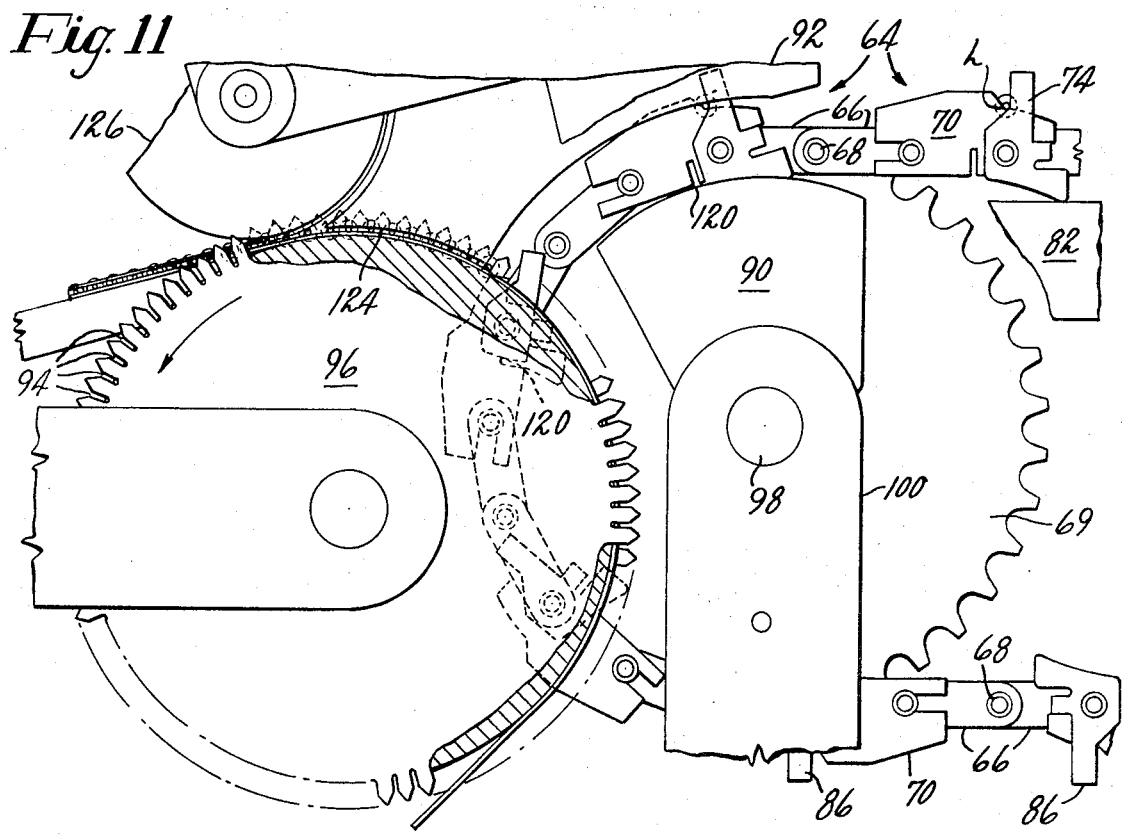
FIG. 11 is a view similar to 10 but at a later moment in the cycle of operation.

The conveyor 22 is driven by means of a motor 110 (FIG. 2) coupled, through a reducer 112, to a drive shaft 114 on which one of the sprockets 69 is mounted. Since, in the illustrative machine, the carriers 64 are spaced on the order of about 3 inches apart, and tooth spaces 94 may be on the order of only about 0.2 inch apart, the taping wheels 96 are positively driven in time relation to the conveyor at a reduction in speed of about 15:1. For this purpose output of the reducer 112 is further decreased at a reducer 116 (FIG. 2) driving a cross-shaft 118 on which the wheels 96 are mounted. It accordingly will be understood that each time a pair of tooth spaces 94 moves into registry with the lower end of the guideway of the plate 92 as indicated in FIG. 10, a carrier 64 delivers the leads L of a component thereto, and the pick-off plates 74 of the carrier are allowed to pivot clockwise about their pins 68 at that moment to a non-interfering position since their tail portions 84 are then disengaged from the cam plate 90. To prevent excessive clockwise movement of the pick-off plates 74, the side plates 70 are each formed with a slot to provide a projecting tang or corner stop 120 (FIGS. 3 and 11). Likewise, for subsequently insuring that the pick-off plates 74 do not move excessively counterclockwise relative to the side plates 70, another pair of stops 122, 122 (FIG. 3) is provided.

On being deposited by a carrier 64 into a pair of tooth spaces 94, the empty carrier continues around in its conveyor path to pick up the next component C assigned by program to be released from a dispenser thereto, and the component delivered to the taping station is advanced by the wheels 96 beneath partly circular guideway 124 formed on the plate 92. A pair of pressure applying rolls 126, 126 (FIGS. 1, 10, 12) is disposed to cooperate with the wheels 96 respectively to apply upper tapes 128, 128 over the leads L as they emerge from the guideway 124, lower tapes 130, 130 being fed from the supply reel 132 rotatably supported by the frame.

Figure 12:
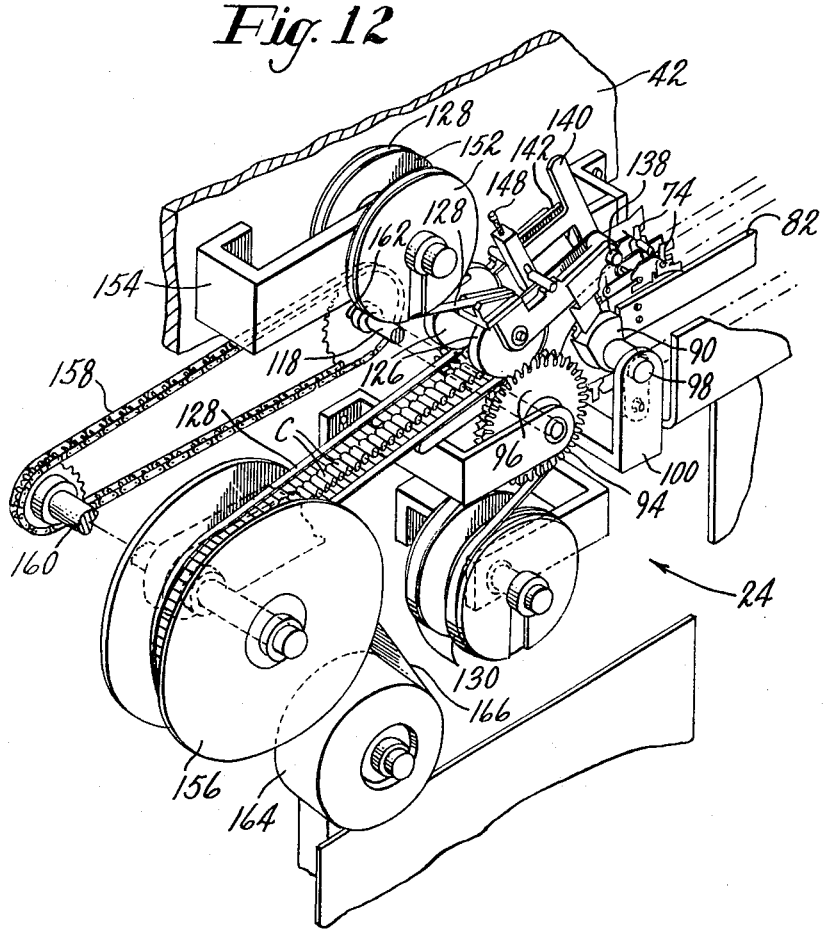
FIG. 12 is a perspective view of the taping and reel-up stations.
Figure 13:
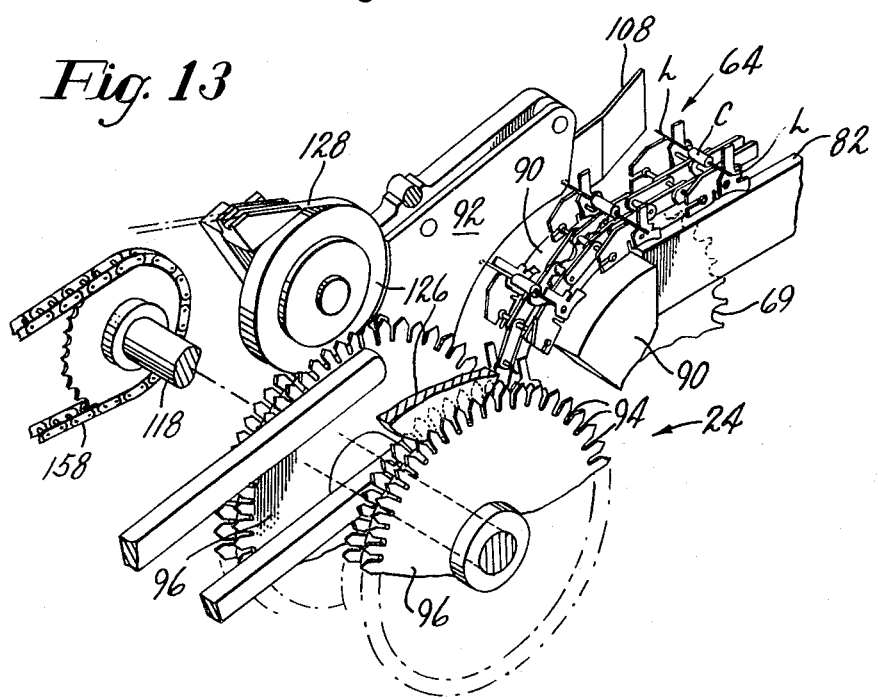
FIG. 13 is a fragmentary view of certain of the parts shown in FIG. 12.

The rolls 126 cause the adhesive tapes 128, 130 to be applied with a pressure adjustable as will next be explained. Referring to FIGS. 1 and 12, the rolls 126 are rotatably carried on a shaft 134 supported in the bend of an L-shaped lever 136. The latter is pivotally mounted on a fulcrum pin 138 for movement between an inactive position (shown by dash lines in FIG. 1) and a pressure applying position. The pin 138 functions, incidentally, to support the lead guides 108. A hand lever 140 also pivotal on the pin 138 carries an integral arm 142 on the end of which a housing 144 is provided for receiving a compression spring 146 and an adjusting screw 148. The arrangement is such that the screw 148 may cause the spring 146 to apply more or less pressure via a bearing pin 150 on the lever 136 and hence on the tapes 128 as they contact the leads. The upper tapes 128 are supplied from reels 152, 152 (FIG. 12) carried by a bracket 154 secured to the machine frame. A take-up reel 156 winds up the programed components. For this purpose a chain 158 couples the shaft 118 to a shaft 160 rotatable yieldably to operate the take-up reel 156 through a torque limiter 162. Desirably, an idler roll 164 (FIG. 12) may supply a separator strip 166 to be wound onto the reel 156 between the layers of taped components.

From the foregoing it will be appreciated that a versatile and reliable machine is provided for rapidly taping different components in preselected order. The carrier construction and related controls for the carrier articulation during component pick-off and component delivery at the taping station insure that the programed order of the components will be promptly realized in actuality and with uniformity.

Having thus described my invention, what I claim as new and desire to secure by Letters Patent of the United States is:

1. In a machine for conveying axial lead components from any selected component dispensers of a series of aligned component dispensers to an operating zone, each of the dispensers having an indexable means for releasing a component into a horizontal lead-engaging shelf defining a pick-off position, an endless conveyor disposed for sequential movement adjacent to the several pick-off positions and the operating zone, said conveyor including a series of articulated carriers respectively including a pivotal pick-off portion uniformly spaced therealong, and cam means adjacent to the path of the conveyor for controlling articulation of the carriers whereby a released component is caused to be picked off by a carrier pick-off portion at said pick-off position and restrained until released at said operating zone.

2. In a machine for successively taping coaxial lead components, at least one component dispenser having a horizontal exit passageway, a chain link conveyor movable in an endless path adjacent to the dispenser, a plurality of discrete component carriers associated with uniformly spaced links of the chain, each carrier including two pairs of laterally spaced plates in pivotal relation, respectively, an edge of each leading plate defining with an edge of a trailing plate a V-notch for receiving a lead of a component when the trailing plate extends in pick-off relation to the dispenser, the corresponding edges of the trailing plate extending in parallel relation for engaging leads in the dispenser passageway, a lead taping station including a toothed wheel adjacent to the conveyor and spaced from the dispenser, means for positively driving the conveyor and the toothed wheel in time relation to enable successive, relatively closely arranged tooth spaces of the wheel to receive and remove leads from the more widely spaced successive V-notches of the carriers, a cam adjacent to said wheel for controlling pivotal opening movement of the trailing plates to release a component into a space between successive teeth of the wheel, and means on the carriers for limiting the relative pivotal movement of their respectively trailing and leading plates.

3. For use in transferring coaxial lead components, in a programmed order, from a series of component dispensers to a processing zone, means including horizontal lead-engaging shelf defining a horizontal exit passageway for releasing single selected components from the respective dispensers, an endless conveyor of pivotal pin-link chain, a plurality of articulated carriers secured to the conveyor chain in uniformly spaced relation and adapted to receive in parallel relation the leads of the components released from dispensers, each of said carriers having a projecting pick-off portion pivotally mounted on a pin of the pin-link chain and extending to transfer a component in said passageway into predetermined position on a carrier, and cam means disposed along the path of the conveyor for controlling component pick-off and release by said carrier.

4. In a machine for producing a taped supply of programed electronic components, a series of component dispensers, a lead taping station remote therefrom and including a rotary, toothed tape applying wheel, a conveyor comprising a plurality of articulated carriers movable in an endless path extending adjacent to the delivery zones of the dispensers and through the lead taping station, each of the carriers having aligned V-notches for receiving and releasing the leads of a component, said V-notches being formed by articulated portions of the carriers, means including a horizontal lead-engaging shelf for selectively releasing a component from a dispenser to the V-notches of a selected carrier while the latter is moving toward said station and while the released component is restrained against rebound from its V-notches, and cam means adjacent to the lead taping station for further opening the angles of the V-notches of successive carriers and causing control of successive components to be transferred from their carriers into the tooth spaces of said tape applying wheel.

5. A machine as set forth in claim 4 wherein the carriers and the wheel are positively driven in the same direction at different speeds, and intersecting arcuate guide surfaces respectively adjacent to the paths of the wheel teeth and the carrier V-notches are disposed to restrain the components.

* * * * *